(12) United States Patent
Loh et al.

(10) Patent No.: US 9,672,161 B2
(45) Date of Patent: Jun. 6, 2017

(54) CONFIGURING A CACHE MANAGEMENT MECHANISM BASED ON FUTURE ACCESSES IN A CACHE

(71) Applicant: Advanced Micro Devices, Sunnyvale, CA (US)

(72) Inventors: Gabriel H. Loh, Bellevue, WA (US); Yasuko Eckert, Kirkland, WA (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 832 days.

(21) Appl. No.: 13/709,054

(22) Filed: Dec. 9, 2012

(65) Prior Publication Data
US 2014/0164711 A1    Jun. 12, 2014

(51) Int. Cl.
*G06F 12/10* (2016.01)
*G06F 12/126* (2016.01)
*G06F 12/0862* (2016.01)

(52) U.S. Cl.
CPC ........ *G06F 12/126* (2013.01); *G06F 12/0862* (2013.01); *Y02B 60/1225* (2013.01)

(58) Field of Classification Search
CPC ............................ G06F 12/0862; G06F 9/383
USPC ........................................................ 711/137
See application file for complete search history.

(56) References Cited

U.S. PATENT DOCUMENTS

| 5,848,287 A * | 12/1998 | Tran ................... G06F 9/30167 708/233 |
| 6,484,241 B2 * | 11/2002 | Arimilli .............. G06F 12/0831 711/141 |
| 2008/0028150 A1 * | 1/2008 | Toussi .......................... 711/122 |

OTHER PUBLICATIONS

N.P. Jouppi, "Improving Direct-Mapped Cache Performance by the Addition of a Small Fully-Associative Cache and Prefetch Buffers", Proceedings of the 17th International Symposium on Computer Architecture, May 1990.

M.K. Qureshi, D. Thompson, and Y.N. Patt, "The V-way Cache: Demand-Based Associativity via Global Replacement", Proceedings of the 32nd International Symposium on Computer Architecture, Jun. 2005.

* cited by examiner

*Primary Examiner* — Jae Yu
(74) *Attorney, Agent, or Firm* — Park, Vaughan, Fleming & Dowler LLP

(57) ABSTRACT

The described embodiments include a cache controller that configures a cache management mechanism. In the described embodiments, the cache controller is configured to monitor at least one structure associated with a cache to determine at least one cache block that may be accessed during a future access in the cache. Based on the determination of the at least one cache block that may be accessed during a future access in the cache, the cache controller configures the cache management mechanism.

18 Claims, 3 Drawing Sheets

CONFIGURING A CACHE MANAGEMENT MECHANISM BASED ON FUTURE ACCESSES IN A CACHE

BACKGROUND

Field

The described embodiments relate to operating caches in computing devices. More specifically, the described embodiments relate to a technique for using future accesses of cache blocks in a cache to configure a cache management mechanism.

Related Art

Many modern computing devices include one or more processors or processor cores with a memory hierarchy that includes a mass-storage device, a main memory, and one or more cache memories (or "caches"). In such devices, the mass-storage device is typically a disk drive or a large semiconductor memory (e.g., flash memory) that provides non-volatile storage for a large amount of data and instructions, and the main memory and the caches are typically smaller, faster semiconductor memories (e.g., dynamic random access memories) that provide volatile storage for smaller amounts of data and instructions. In these devices, the caches can be arranged in levels that include a small "level one" (L1) cache for the most rapid access to data and instructions, a larger, sometimes shared, "level two" (L2) cache for less rapid access to data and instructions, and a largest, typically shared, "level three" (L3) cache for the least rapid access (of the caches) to data and instructions. An example device includes four processor cores, each processor core including an internal 96 kilobyte (KB) L1 cache, as well as a 2 megabyte (MB) L2 cache and an 8 MB L3 cache that are each shared by two or more of the processor cores. In addition to these caches, a memory hierarchy for the example computing device includes a 16 GB main memory and a 2 terabyte (TB) mass-storage device.

During operation, data can be retrieved from the mass-storage device and stored in one or more of the caches to enable the more rapid access to the data by the processor cores. However, because the caches in the memory hierarchy are smaller at each level, the caches typically cannot be used to store all of the data that the processor cores may need retrieved from the mass-storage device. The computing device is therefore commonly forced to evict data from a given cache to the next level of the memory hierarchy in order to make space for new data to be stored in the cache.

There have been various techniques proposed for determining the data to be evicted from the main memory and caches. Generally, these techniques rely on past information about the data in the caches such as the recent use of the data, the relative times when data was placed in the cache, the recent data that has been evicted, etc. However, using past information about the data in caches when making eviction decisions can result in inefficient eviction of data from the caches. For example, useful data may be evicted from the cache and therefore not present in the cache for future accesses, which requires a time-consuming retrieval of the data in lower levels of the caches, main memory, or the mass-storage device.

SUMMARY

The described embodiments include a cache controller that configures a cache management mechanism. In the described embodiments, the cache controller is configured to monitor at least one structure associated with a cache to determine at least one cache block that may be accessed during a future access in the cache. Based on the determination of the at least one cache block that may be accessed during a future access in the cache, the cache controller configures the cache management mechanism.

In some embodiments, when monitoring the at least one structure associated with the cache, the cache controller is configured to monitor at least one higher-level cache or functional block that comprises information indicating cache blocks that may be accessed during a future access in the cache.

In some embodiments, when monitoring the at least one higher-level cache, the cache controller is configured to monitor at least one of: (1) a record of misses in the at least one higher-level cache, or (2) a record of prefetches to be sent from the at least one higher-level cache.

In some embodiments, when monitoring the at least one functional block, the cache controller is configured to monitor at least one of: (1) fetch operations in a fetch queue; (2) loads or stores in a load buffer or a store buffer; or (3) branch predictions in a branch prediction queue.

In some embodiments, when monitoring the at least one higher-level cache or functional block, the cache controller is configured to directly acquire the information from the at least one higher-level cache or functional block.

In some embodiments, the cache controller is configured to periodically receive the information from the at least one higher-level cache or functional block. In these embodiments, the cache controller is configured to store the information in a tracking mechanism. Then, when monitoring the at least one higher-level cache or functional block, the cache controller is configured to acquire the information indicating cache blocks that may be accessed during a future access in the cache from the tracking mechanism.

In some embodiments, the tracking mechanism comprises a data structure. In these embodiments, when periodically receiving the information from the at least one higher-level cache or functional block and storing the information in a tracking mechanism, the cache controller is configured to receive address information from the at least one higher-level cache or functional block for at least one cache block that may be accessed during a future access, the address information comprising at least some of a plurality of address bits of an address for the at least one cache block. Then the cache controller uses the address information to update the data structure.

In some embodiments, when configuring the cache management mechanism, the cache controller configures the cache management mechanism so that a cache block that may be accessed during a future access in the cache is not replaced in the cache.

In some embodiments, when configuring the cache management mechanism, the cache controller configures the cache management mechanism so that a cache block that is not a cache block that may be accessed during a future access in the cache is not stored in the cache.

In some embodiments, the at least one cache block that may be accessed during a future access in the cache is included in a set of cache blocks typically considered as a group for replacement in accordance with a cache replacement policy. In these embodiments, configuring the cache management mechanism includes configuring the cache management mechanism so that the at least one cache block is not considered for replacement, but remaining cache blocks in the set of cache blocks are considered for replacement.

BRIEF DESCRIPTION OF THE FIGURES

Throughout the figures and the description, like reference numerals refer to the same figure elements.

DETAILED DESCRIPTION

Figure 1:
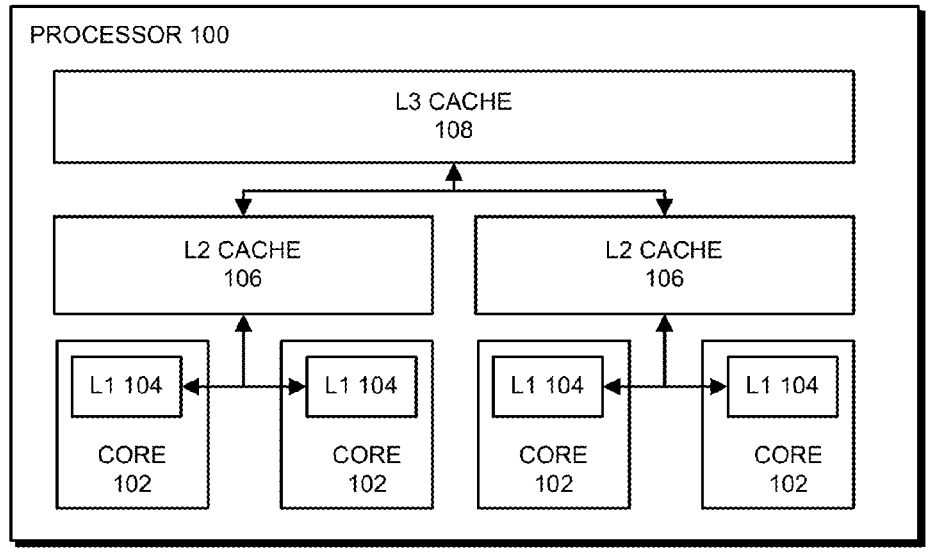
FIG. 1 presents a block diagram illustrating a processor in accordance with some embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

In some embodiments, a computing device (e.g., computing device 210 in FIG. 2) uses code and/or data stored on a computer-readable storage medium to perform some or all of the operations herein described. More specifically, the computing device reads the code and/or data from the computer-readable storage medium and executes the code and/or use the data when performing the described operations.

A computer-readable storage medium may be any device or medium or combination thereof that stores code and/or data for use by a computing device. For example, the computer-readable storage medium may include, but is not limited to, volatile memory or non-volatile memory, including flash memory, random access memory (eDRAM, RAM, SRAM, DRAM, DDR, DDR2/DDR3/DDR4 SDRAM, etc.), read-only memory (ROM), and/or magnetic or optical storage mediums (e.g., disk drives, magnetic tape, CDs, DVDs). In the described embodiments, the computer-readable storage medium does not include non-statutory computer-readable storage mediums such as transitory signals.

In some embodiments, one or more hardware modules are configured to perform the operations herein described. For example, the hardware modules may comprise, but are not limited to, one or more processors/processor cores, application-specific integrated circuit (ASIC) chips, field-programmable gate arrays (FPGAs), caches/cache controllers, embedded processors, graphics processors/cores, pipelines, and/or other programmable-logic devices. When such hardware modules are activated, the hardware modules may perform some or all of the operations. In some embodiments, the hardware modules include one or more general-purpose circuits that are configured by executing instructions (program code, firmware, etc.) to perform the operations.

Overview

The described embodiments determine future accesses that may occur for cache blocks in a cache memory (or "cache") in a computing device and configure a cache management mechanism based on the determined future accesses.

In determining future accesses that may occur for cache blocks, the described embodiments can monitor any type of structure that provides an indication of operations that may cause, prevent, modify, or otherwise effect future accesses in the cache, where "accesses in the cache" include any type of access of one or more cache blocks, such as reads, writes, and/or invalidations of the cache blocks. The structures monitored to determine future accesses include lower-level or higher-level caches, functional blocks in processors or processor cores that access the cache, and/or other structures in the computing device. For example, when monitoring a higher-level cache, the described embodiments may monitor a record of misses in the higher-level cache, a record of prefetches to be forwarded from the higher-level cache to the cache, and/or other mechanisms or operations in the higher-level cache. As another example, when monitoring a processor or processor core that accesses the cache, the described embodiments may monitor functional blocks such as a fetch unit for future instruction fetches, an execution unit for future loads or stores, a branch prediction unit for predictions for branches in program code, and/or other functional blocks or operations in the processor or processor core.

When configuring a cache management mechanism based on the determined future accesses, the described embodiments may configure the cache management mechanism to perform any relevant operation for handling one or more cache blocks based on the future accesses in accordance with the type of determined future access. For example, the cache management mechanism may be configured to retain, overwrite, invalidate, delete, modify a coherency state, change metadata for, and/or otherwise update one or more cache blocks in the cache based on the future accesses. As another example, the cache management mechanism may be configured to prevent one or more cache blocks from being stored in the cache. As yet another example, the cache management mechanism may be configured to prevent one or more cache blocks from being considered for replacement as part of a set of cache blocks that are typically considered for replacements (e.g. remove one or more cache blocks in a set from consideration for replacement under a replacement policy such as least-recently-used or LRU).

Note that the described embodiments are described as determining future accesses that "may occur" for cache blocks in a cache and configuring a cache management mechanism based on the determined future accesses. In some embodiments, the determined future accesses may be speculative. For example, when a branch prediction unit is checked to determine a branch prediction that causes one or more future accesses in the cache, the branch prediction may eventually be discovered to be incorrect. In this case, the future access to the cache may not occur and hence the cache management mechanism may be configured based on a future access that never actually occurs. However, because cache blocks may be reloaded from lower-level caches, memory, or a mass-storage device (e.g., a hard disk), any adjustment in handling of a cache blocks by the cache management mechanism may cause delay, but will not cause errors.

By using future accesses to configure the cache management mechanism, the described embodiments enable more efficient operation of caches. For example, by avoiding evicting one or more cache blocks from caches when the cache blocks may be used in a future access to the cache.

The more efficient operation of caches enables quicker returns of data from the cache, avoids unnecessary power consumption, reduces bandwidth consumption in a computing device in which the caches are used, and generally enables more efficient overall operation of a computing device in which the caches are used.

Processor with Cache Hierarchy

FIG. 1 presents a block diagram illustrating a processor 100 in accordance with some embodiments. As can be seen in FIG. 1, processor 100 includes four processor cores 102. Generally, each processor core 102 includes a computational mechanism such as a central processing unit (CPU), a graphics processing unit (GPU), and/or an embedded processor.

Processor 100 also includes a hierarchy of cache memories (or "caches") that are used for storing instructions and data that is used by the processor cores 102. As can be seen in FIG. 1, the hierarchy of caches in processor 100 includes a level-one (L1) cache 104 (shown as "L1 104" in FIG. 1) in each processor core 102 that is used for storing instructions and data for use by the processor core 102. Generally, the L1 caches 104 are the smallest of the caches in the hierarchy and are located closest to the circuits (e.g., execution units, instruction fetch units, etc.) in the processor cores 102 that use the instructions and data that are stored in the L1 caches 104. The closeness of the L1 cache 104 to the circuits that use the stored instructions and data enables the fastest access to the stored instructions and data from among the caches in the hierarchy of caches. As an example, each of the L1 caches 104 may be 96 KB in size.

The level-two (L2) caches 106 are next in the hierarchy of caches in processor 100. Each L2 cache 106 is shared by two processor cores 102 and hence is used for storing instructions and data for both of the sharing processor cores 102. The L2 caches 106 are mid-sized caches in the hierarchy and are located close to the sharing processor cores 102. Accessing data and instructions in an L2 cache 106 is faster than accessing data and instructions in L3 cache 108, but slower than accessing data and instructions in L2 cache 106 in L1 cache 104. As an example, each of the L2 caches may be 2048 KB in size.

The level-three (L3) cache 108 is next in the hierarchy of caches in processor 100 (and on the lowest level of the hierarchy of caches in processor 100). The L3 cache 108 is shared by all of the processor cores 102 and hence is used for storing instructions and data for all of the processor cores 102. L3 cache 108 is the largest cache in the hierarchy and is located so as to be accessible to all of the processor cores 102. Accessing data and instructions in L3 cache 108 is faster than accessing data and instructions in structures outside the processor (e.g., memory 204 or mass-storage device 208 such as in FIG. 2), but slower than accessing data and instructions in L2 cache 106. As an example, the L3 cache is 16 megabytes (MB) in size.

In some embodiments, L1 cache 104, L2 cache 106, and L3 cache 108 (collectively, "the caches") are fabricated from memory circuits with low access times to improve the speed at which access requests (e.g., reads and writes) are performed by the caches. For example, the caches may be implemented one or more of static random access memory (SRAM), embedded dynamic random access memory (eDRAM), DRAM, double data rate synchronous DRAM (DDR SDRAM), and/or other types of memory circuits.

Although embodiments are described with a particular arrangement of processor cores, some embodiments include a different number and/or arrangement of processor cores. For example, some embodiments include only one processor core (in which case the cache hierarchy is used by the single core), while other embodiments include two, five, eight, or another number of processor cores—with the cache hierarchy adjusted accordingly. Generally, the described embodiments can use any arrangement of processor cores that can perform the operations herein described.

Additionally, although embodiments are described with a particular arrangement of caches, some embodiments include a different number and/or arrangement of caches. For example, in some embodiments, some or all of the caches (e.g., L1 caches 104, etc.) are divided into separate instruction and data caches. Additionally, L2 cache 106 and or L3 cache 108 may not be shared in the same way as shown, and hence may only be used by a single processor core, two processor cores, etc. (and hence there may be multiple L2 caches 106 and/or L3 caches 108 in processor 102). As another example, some embodiments include different levels of caches, from only one level of cache to multiple levels of caches, and these caches can be located in processor 100 and/or external to processor 100. For example, in some embodiments, L3 cache 108 is located on a different die then (and hence external to) processor 100. Generally, the described embodiments can use any arrangement of caches that can perform the operations herein described.

Moreover, although processor 100 is simplified for illustrative purposes, in some embodiments, processor 100 includes additional mechanisms for performing the operations of processor 100. For example, processor 100 may include power controllers, input-output mechanisms, communication mechanisms, networking mechanisms, display mechanisms, etc.

Computing Device with Memory Hierarchy

Figure 2:
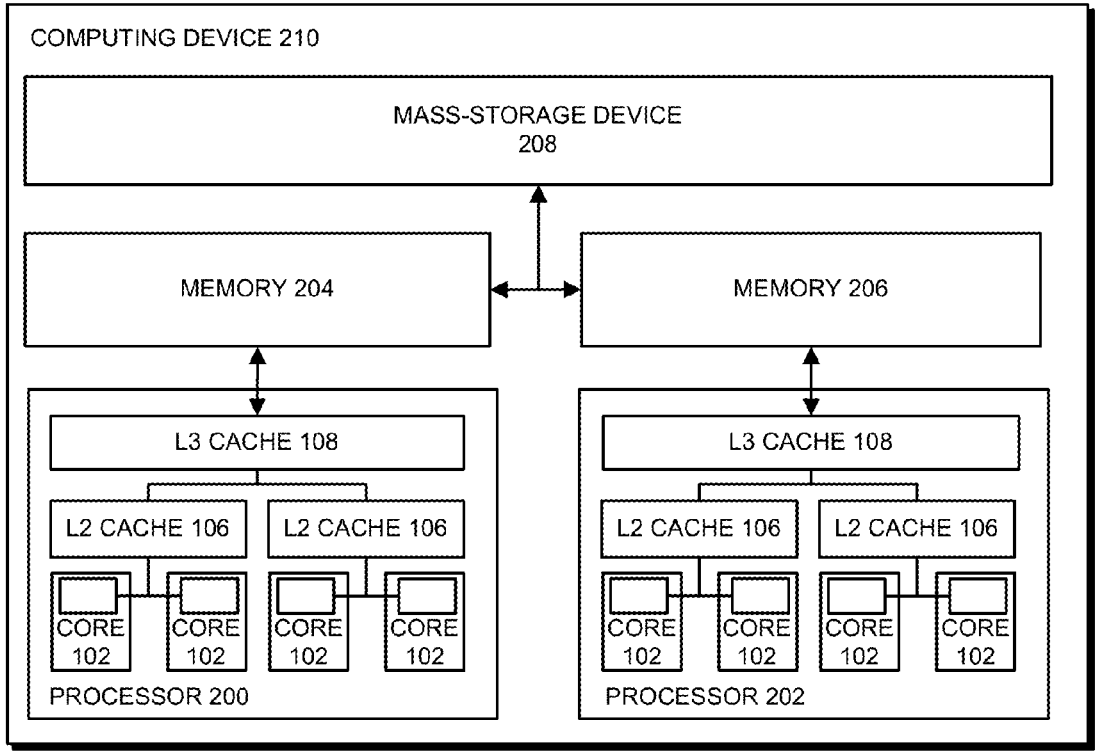
FIG. 2 presents a block diagram illustrating a computing device accordance with some embodiments.

FIG. 2 presents a block diagram illustrating a computing device 210 with a memory hierarchy in accordance with some embodiments. In computing device 210, processor 200 is coupled to memory 204 and processor 202 is coupled to memory 206. Memory 204 and memory 206 are in turn coupled to mass-storage device 208. In some embodiments, processors 200 and 202 are similar to processor 100. For example, processors 200 and 202 may include processor cores and a cache hierarchy such as shown in FIG. 1. However, for clarity, some of the labeling from FIG. 1 has not been included in FIG. 2, such as the label "L1 104" in the L1 caches 104 in FIG. 2.

Memory 204 and memory 206 are memory circuits that form a main memory of computing device 210 (and memory 204 and memory 206 are collectively referred to as "main memory"). The main memory is shared by both processors 200 and 202, and hence is used for storing instructions and data for both processor 200 and 202. In other words, processors 200 and 202 may access instructions and data in both memory 204 and 206. In some embodiments, memory 204 and memory 206 each hold separate portions of the data and instructions that may be held in the main memory. For example, assuming main memory is a total of 32 GB in size, memory 204 includes storage for the first/lowest 16 GB in the main memory and memory 206 includes storage for the second/highest 16 GB in the main memory. Accessing data and instructions in the main memory is faster than accessing data and instructions in mass-storage device 208, but slower than accessing data and instructions in the caches.

In some embodiments, the main memory is fabricated from memory circuits with low access times to improve the speed at which access requests (e.g., reads and writes) are performed by the memory. For example, main memory may be implemented in one or more of dynamic random access memory (DRAM), double data rate synchronous DRAM (DDR SDRAM), and/or other types of integrated memory circuits.

Mass-storage device 208 is a non-volatile memory such as a disk drive or a large flash memory that is the largest repository for data and instructions in computing device 210. As with the main memory, mass-storage device 208 is shared by processors 200 and 202. Although mass-storage device 208 stores significantly more data and instructions than main memory and/or any of the caches, accessing data and instructions in the mass-storage device 208 takes the longest time of any access in computing device 210. As an example, mass-storage device 208 may be 4 terabytes (TB) in size.

Taken as a whole, L1 caches 104, L2 caches 106, L3 cache 108, memories 204 and 206, and mass-storage device 208 form a memory hierarchy in computing device 210. Various aspects of the memory hierarchy are used by each of processors 200 and 202 for storing instructions and data. As described above, starting from L1 cache 104 in each processor and proceeding through the levels in the memory hierarchy to mass-storage device 208, each level comprises a memory element of larger sizes, but longer access times.

In some embodiments, when data (or an instruction) is to be accessed by one of the processor cores 102, the processor core 102 determines if a block of instructions and/or data (e.g., a page 4 KB in size) that includes the data to be accessed is available in the main memory (i.e., in a corresponding one of memory 204 or memory 206). If not, the processor core 102 causes the page to be retrieved from mass-storage device 208 and stored in main memory. The processor core 102 then proceeds with accessing the data in the memory hierarchy.

When accessing the data, the processor core 102 first sends a request for the data to the corresponding L1 cache 104. Upon receiving the request, L1 cache 104 performs a lookup operation to determine if a cache block that includes the requested data is stored in L1 cache 104. If the cache block is present in L1 cache 104, L1 cache 104 returns the data to the requesting processor core 102 and the request is satisfied. Otherwise, L1 cache 104 forwards the request to the next lower level of cache, L2 cache 106.

Upon receiving the request, L2 cache 106 performs a lookup operation to determine if a cache block that includes the requested data is stored in L2 cache 106. If the cache block is present in L2 cache 106, L2 cache 106 returns the data to the requesting processor core 102 and the request is satisfied. In some embodiments, returning the data to the requesting processor core means returning the cache block to the corresponding L1 cache 104. The L1 cache 104 then forwards the cache block to the requesting processor core 102 satisfy the request and stores the cache block in an appropriate location in L1 cache 104. When the cache block is not present in L2 cache 106, L2 cache 106 forwards the request to the next lower level of cache, L3 cache 108.

Upon receiving the request, L3 cache 108 performs a lookup operation to determine if a cache block that includes the requested data is stored in L3 cache 108. If the cache block is present in L3 cache 108, L3 cache 108 returns the data to the requesting processor core 102 and the request is satisfied. In some embodiments, returning the data to the requesting processor core means returning the cache block to L2 cache 106. L2 cache 106 then forwards the cache block to the L1 cache 104 to satisfy the request (where it is handled as described above) and stores the cache block in an appropriate location in L2 cache 106. When the cache block is not present in L3 cache 108, L3 cache 108 forwards the request to main memory to be satisfied.

Upon receiving the request, main memory (i.e., memory 204 or memory 206) retrieves the cache block from the page of memory and returns the cache block data to the requesting processor core 102 and the request is satisfied. In some embodiments, returning the data to the requesting processor core means returning the cache block to L3 cache 108. L3 cache 108 then forwards the cache block to the L2 cache 106 to satisfy the request (where it is handled as described above) and stores the cache block in an appropriate location in L3 cache 108.

Although an embodiment is described where memory 204 and memory 206 are separate, in alternative embodiments, memory 204 and memory 206 are not separate. Additionally, in some of the embodiments shown in FIG. 2, memory 204 and memory 206 are included in a "socket" with an integrated circuit processor chip, including possibly being contained within a same package or semiconductor die as a processor chip.

In addition, although the memory hierarchy in FIG. 2 includes various caches, main memory, and mass-storage device 208, some embodiments include a different number and/or arrangement of caches, memory, and/or mass-storage devices. Generally, the described embodiments can use any arrangement of caches, memories, and/or mass-storage devices that can perform the operations herein described.

Structures to be Monitored to Determine Future Accesses in a Given Cache

Figure 3:
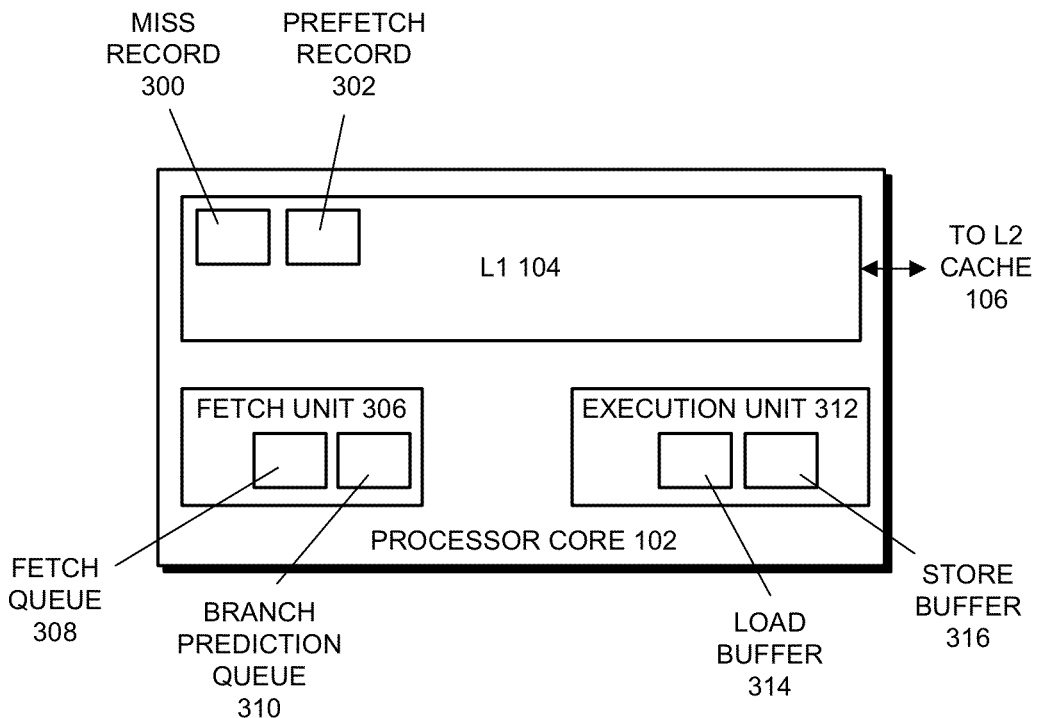
FIG. 3 presents a block diagram illustrating a processor core in accordance with some embodiments.

FIG. 3 presents a block diagram illustrating a processor core 102 in accordance with some embodiments. Processor core 102 shown in FIG. 3 is a simplified processor core illustrating various example records and functional blocks that may be monitored to determine future accesses that may be made to caches such as L1 cache 104 or L2 cache 106 (not shown in FIG. 3) to enable the configuration of a cache management mechanism 408 (see FIG. 4) in L1 cache 104 or L2 cache 106. Note that, although example records and functional blocks are described for L1 cache 104 and processor core 102, some embodiments include, and may monitor, similar records and/or functional blocks in lower-level caches, such as L2 cache 106 and/or L3 cache 108.

The first of the example records is miss record 300 in L1 cache 104, which may be stored in a miss status holding register (or MSHR) in L1 cache 104. Miss record 300 is a record of lookups for cache blocks requested by processor core 102 that missed in L1 cache 104, e.g., because the cache blocks were not present in L1 cache 104. The underlying requests for which the misses were encountered may eventually be forwarded from L1 cache 104 to L2 cache 106 to attempt to satisfy the request in L2 cache 106. Hence, miss record 300 can be used to determine future accesses that may be made to L2 cache 106 (and possibly L3 cache 108).

The second of the example records is prefetch record 302 in L1 cache 104. Prefetch record 302 is a record of prefetches to be forwarded from L1 cache 104 to L2 cache 106. The underlying prefetch requests may eventually be forwarded from L1 cache 104 to L2 cache 106 to attempt to load the cache block from the L2 cache 106 to the L1 cache 104 (or otherwise handled in the L1 cache 104). Hence, prefetch record 302 can be used to determine future accesses that may be made to L2 cache 106 (and possibly L3 cache 108).

The first of the example functional blocks is fetch unit 306, which includes fetch queue 308 and branch prediction queue 310. Generally, fetch unit 306 is a functional block in processor core 102 that determines instructions to be executed and sends requests to L1 cache 104 (and further up in the memory hierarchy, if necessary) to fetch the determined instructions. Fetch queue 308 in fetch unit 306 includes records of one or more instructions to be fetched for execution in processor core 102. Branch prediction queue 310 includes records of one or more predicted branch targets (i.e., jumps in program code execution) from which instructions should be fetched. The instructions to be fetched and the predicted branch targets can be used together or separately to determine future accesses that may be made to L1 cache 104 (and possibly L2 cache 106, etc.).

The second of the example functional blocks is execution unit 312, which includes load buffer 314 and store buffer 316. Generally, execution unit 312 is a functional block in processor core 102 that executes instructions to perform operations in processor core 102. Load buffer 314 and store buffer 316 in execution unit 312 include records of pending loads and stores, respectively, that are buffered awaiting forwarding to L1 cache 104 (and further up in the memory hierarchy, if necessary) and/or data bypassing (e.g., data may be bypassed from a pending store/stores in store buffer 316 to a pending load in load buffer 314, etc.). The buffered loads and stores can be used together or separately to determine future accesses that may be made to L1 cache 104 (and possibly L2 cache 106, etc.).

In some embodiments, values (e.g., addresses, program counters, request types, etc.) from the above-described records and functional blocks are used directly to determine future accesses to be made. However, in some embodiments, one or more intermediate calculations, translations, etc. are performed on values acquired via the monitoring to determine adjusted values that are used to determine the future accesses.

When determining future accesses to be made in given caches, some embodiments directly acquire values from the monitored structure and then use those values to determine future accesses to be made to the given cache. For example, some embodiments directly read miss record 300 and/or prefetch record 302 and use the listed misses and/or prefetches to determine future accesses to be made to L2 cache 106. However, because some of the monitored structures may be impractical to monitor directly due to timing constraints, circuit area constraints, etc., alternative embodiments echo/copy the values from the monitored structure into another data structure, e.g., within the given cache (or in another convenient location), that are then read to enable determining the future accesses to be made.

In the described embodiments, the future accesses to be made to the cache may include any number or size of cache blocks including individual bytes within the cache, lines within the cache, multiple-line blocks, etc. Generally, any portion of the cache that can be determined to be operated on during a future access (read, written, invalidated, etc.) can have future accesses determined for using the above described records and functional blocks.

Although various records and functional blocks are shown in FIG. 3, the described embodiments may monitor any type of structure that provides an indication of operations that may cause or prevent future accesses in the cache, including lower-level or higher-level caches, functional blocks in processors or processor cores that access the cache, and/or other structures in the computing device. Additionally, although processor core 102 is shown in FIG. 3 with various mechanisms, in some embodiments, processor core 102 includes other and/or additional mechanisms (not shown) for performing processor operations.

Cache with Management Mechanism

As described above, each of the caches in the hierarchy of caches includes a limited amount of memory for storing cache blocks (e.g., in the example embodiment described above, 96 KB for L1 cache 104, 2048 KB for L2 cache 106, etc.). Because each of the caches include a limited amount of memory, every cache block that may be loaded from main memory (or from mass-storage device 208) cannot be simultaneously stored in a given cache. Instead, locations in the caches are shared—and therefore made available for storing cache blocks from various addresses in memory. In the described embodiments, any of a number of techniques may be used for managing the storage of cache blocks in the limited memory in the caches.

Figure 4:
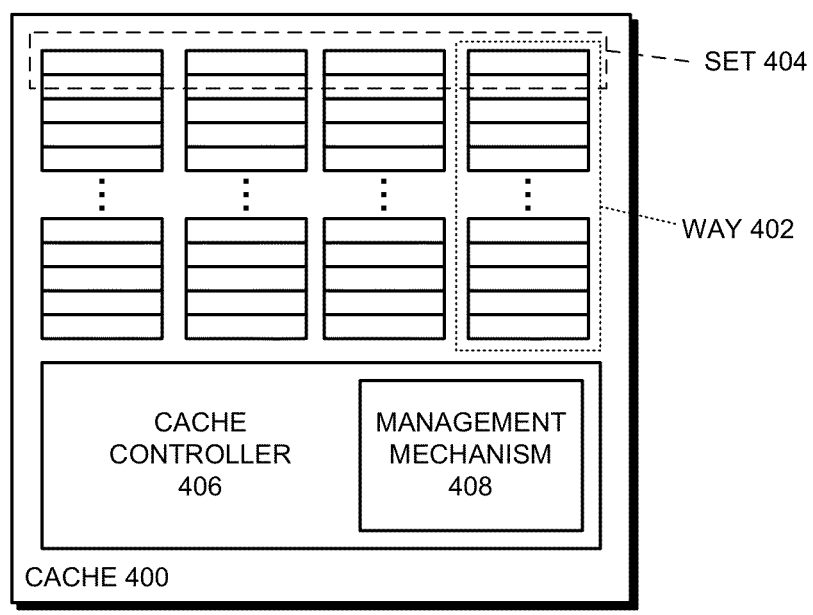
FIG. 4 presents a block diagram illustrating a cache in accordance with some embodiments.

For example, some embodiments use "set associativity" for managing the available memory in at least some of the caches in the hierarchy of caches shown in FIG. 1. For set associativity, the memory in the cache is divided into a number of sets, and the sets are further divided into a number of ways. FIG. 4 presents a block diagram illustrating ways and sets in a cache 400 in accordance with some embodiments. As can be seen in FIG. 4, cache 400 includes four ways, with an example way 402 outlined using a dashed line around a rightmost of the four ways in cache 400. In an example embodiment where cache 400 is 512 KB in size and 1 KB cache blocks are to be stored in cache 400, each way has storage for 128 cache blocks, and hence each way is divided into 128 sets (with ellipses representing sets not shown in FIG. 4). Each of the sets has a location in each way, with an example set 404 outlined by a dashed line around a topmost of the sets. Each set can be used to store cache blocks from a range of memory addresses, and hence the location in each way for the set can be used to store cache blocks from the range of memory addresses.

In embodiments that use set associativity, upon receiving a cache block to be stored in the cache, cache controller 406 in cache 400 determines the set in which the cache block is to be stored. For example, in some embodiments, cache controller 406 may use some or all of the address for the cache block to determine a set in the cache 400 into which the cache block may be stored. Cache management mechanism 408 in cache controller 406 then determines if one of the locations for the set in one of the ways is available for use without replacing the cache block in that location (i.e., when there is an available/open location in the set). When a location for the set in one of the ways is available for use without replacing the cache block, cache controller 406 stores the cache block into a location for the set in one of the ways.

However, when cache management mechanism 408 determines that there is no location for the set that is available for use without replacing the cache block in that location, cache management mechanism 408 determines a cache block that is to be replaced from among the locations in the set. In other words, when each location in a given set is in use for storing a cache block, in order to store a new cache block to the set, the cache block in one of the existing locations must be evicted from cache 400 (e.g., written to a next lower level of cache or to memory and/or overwritten) to make space for the cache block. When determining the cache block that is to be replaced, cache management mechanism 408 adheres to a replacement policy, which is generally an algorithm or set of rules used to determine the cache block that is to be evicted. In some embodiments, the replacement policy includes a first-in-first out policy, in which the first cache block to be stored in a set is evicted, a least-recently-used policy, in which the least recently accessed location in the set is evicted, and/or another type of replacement policy. As described below, in some embodiments, cache controller 406 adjusts and/or overrides the replacement policy used by cache management mechanism 408 based on future accesses to the cache.

Although some embodiments are described using set associativity, other embodiments use different types of associativity, such as skewed associativity, full associativity, etc., and/or some other form of replacement policy for the cache. Generally, the described embodiments can operate in any cache with a cache management mechanism that can be configured (e.g., to retain, delete, and/or invalidate cache lines) based on a determination of at least one cache block that may be accessed during a future access in the cache.

Process for Configuring a Cache Management Mechanism Based on Future Accesses

Figure 5:
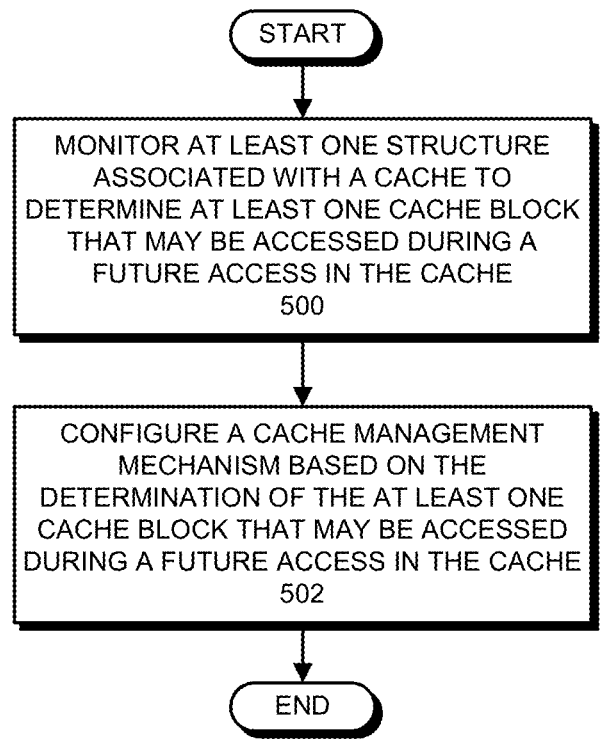
FIG. 5 presents a flowchart illustrating a process for configuring a cache management mechanism based on future accesses in accordance with some embodiments.

FIG. 5 presents a flowchart illustrating a process for configuring cache management mechanism 408 based on future accesses in accordance with some embodiments. Note that the operations in FIG. 5 are presented as a general example of some functions that may be performed by the described embodiments. The operations performed by some embodiments include different operations and/or operations that are performed in a different order. Additionally, although certain mechanisms in cache 400 are used in describing the process, in alternative embodiments, other mechanisms may perform the operations.

As can be seen in FIG. 5, the process starts when cache controller 406 in cache 400 monitors at least one structure associated with cache 400 to determine at least one cache block that may be accessed during a future access in cache 400 (step 500). As described above, when monitoring structures associated with the cache, cache controller 406 may monitor any type of structure that provides an indication of operations that may cause or prevent future accesses in the cache 400, including other caches, functional blocks in processors/processor cores that access the cache, and/or other structures in the computing device. For example, assuming that cache 400 is an L1 cache 104, cache controller 406 may monitor load buffer 314 to determine future data loads to be forwarded to cache 400 or may monitor fetch queue 308 to determine future instructions to be requested from L1 cache 104 from fetch unit 306. As another example, assuming that cache 400 is an L2 cache 106, cache controller 406 may monitor a miss record 300 or a prefetch record 302 in an associated L1 cache 104.

Recall that monitoring these structures may include reading a local data structure that includes values copied/echoed from the structures instead of (or in combination with) reading values from the structures directly. For example, some embodiments periodically receive the information about future accesses from the structures and store the information in a tracking mechanism such as a register/memory, variable, a list/table/array, etc. In these embodiments, monitoring the structure includes acquiring the information indicating cache blocks that may be accessed during a future access in the cache from the tracking mechanism.

In some embodiments, periodically receiving the information from the structures and storing the information in a tracking mechanism includes receiving address information from the structures for at least one cache block that may be accessed during a future access. In these embodiments, the address information includes at least some of a set of address bits of an address for the at least one cache block. For example, the address information may include a lower K bits of a P-bit address, where K<P. These embodiments may use the address information to update the data structure (i.e., as at least some of the information indicating future accesses that may be made in the cache).

Cache controller 406 then configures cache management mechanism 408 based on the determination of the at least one cache block that may be accessed during a future access in the cache (step 502). In some embodiments, cache controller 406 configures cache management mechanism 408 to perform a given operation on a particular cache block such as retaining, overwriting, invalidating the cache block, etc. Additionally, in some embodiments, cache controller 406 configures cache management mechanism 408 so that a given replacement policy (e.g., first-in-first-out, least-recently-used, etc.) is or is not performed on one or more particular cache blocks. For example, in some embodiments, cache controller 406 configures cache management mechanism 408 so that a given block is removed from consideration during a determination of a block to be evicted from a set.

As one example of a configuration of the cache management mechanism 408, in some embodiments, cache controller 406 configures the cache management mechanism 408 so that a cache block that may be accessed during a future access in the cache is not replaced in the cache. For instance, assuming that cache 400 is an L1 cache 104, cache controller 406 may determine from, e.g., load buffer 314 that cache block A is likely to be accessed soon (i.e., a request is to be sent to the cache based on a load operation), and may prevent cache management mechanism 408 from evicting cache block A.

Generally, any appropriate mechanism may be used for preventing cache management mechanism 408 from evicting cache block A, including setting a value/variable in cache management mechanism 408, setting a value in the cache block (e.g., a flag in metadata for the cache block, etc.), updating an entry in a "do-not-replace" table, etc. The value, once set, is subsequently checked and the corresponding cache line may not be evicted when the value is set.

As another example of a configuration of the cache management mechanism 408, in some embodiments, cache controller 406 configures the cache management mechanism 408 so that a cache block that is not a cache block that may be accessed during a future access in the cache is not stored in the cache. For instance, assume that cache 400 is an L1 cache 104, that cache block D is received in cache 400 as a candidate for storing in the cache, and that storing cache block D would mean evicting one of cache blocks A, B, or C to clear a location for storing cache block D. In this case, cache controller 406 may determine from, e.g., fetch queue 308 and/or branch prediction queue 310 that cache blocks A, B, and C are likely to be accessed soon (i.e., a request is to be sent to the cache to fetch the cache block for fetching instructions), and may prevent cache block D from being stored in cache 400. As described above, any appropriate mechanism may be used for preventing cache management mechanism 408 from evicting cache blocks A, B, and C. Note that, in this example, cache block D may be delivered to a requesting processor core 102 for use in the processor core 102, but is not cached/stored in cache 400.

As yet another example of a configuration of the cache management mechanism 408, in some embodiments, a cache block A that may be accessed during a future access in cache 400 is included in a set of cache blocks A, B, C, and D that are typically considered as a group for replacement in accordance with a cache replacement policy. For example, in a cache that uses a least-recently-added replacement policy, cache blocks A, B, C, and D may be members of a set (e.g., set 404) of which a least recently added cache block is to be evicted to clear a location for storing a new cache block E. In some embodiments, cache controller 406 configures cache management mechanism 408 so that cache block A is not considered for replacement, but remaining cache blocks B, C, and D in the set are considered for replacement. In this example, this means that a least recently added cache block from among cache blocks B, C, and D should be evicted to clear a location for cache block E—and cache block A should be retained in cache 400.

Additional Types of Caches

Although embodiments are described where future accesses are determined for caches that hold data and instructions to enable configuring a cache management mechanism in the caches, some embodiments are operable with any form of cache and/or functional block where future accesses can be determined and then used to configure a management mechanism. For example, in some embodiments, a level-two (L2) L2 translation lookaside buffer (TLB) monitors the future/pending misses of one or more level-one (L1) TLBs and uses the future misses to configure a TLB management mechanism.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method for configuring a cache management mechanism, comprising:
   in a cache controller performing operations for:
      monitoring at least one structure associated with a cache to determine at least one cache block that may be accessed during a future access in the cache, wherein the at least one cache block consists of one or more cache lines within the cache; and
      configuring a cache management mechanism based on the determination of the at least one cache block that may be accessed during a future access in the cache, the configuring comprising configuring the cache management mechanism so that a cache block that may be accessed during a future access in the cache is not replaced in the cache.

2. The method of claim 1, wherein monitoring the at least one structure associated with the cache comprises:
   monitoring at least one higher-level cache or functional block that comprises information indicating cache blocks that may be accessed during a future access in the cache.

3. The method of claim 2, wherein monitoring the at least one higher-level cache comprises monitoring at least one of:
   a record of misses in the at least one higher-level cache; or
   a record of prefetches to be sent from the at least one higher-level cache.

4. The method of claim 2, wherein monitoring the at least one functional block comprises monitoring at least one of:
   fetch operations in a fetch queue;
   loads or stores in a load buffer or a store buffer; or
   branch predictions in a branch prediction queue.

5. The method of claim 2, wherein monitoring the at least one higher-level cache or functional block comprises directly acquiring the information from the at least one higher-level cache or functional block.

6. The method of claim 2, further comprising:
   periodically receiving the information from the at least one higher-level cache or functional block; and
   storing the information in a tracking mechanism;
   wherein monitoring the at least one higher-level cache or functional block comprises acquiring the information indicating cache blocks that may be accessed during a future access in the cache from the tracking mechanism.

7. The method of claim 6, wherein the tracking mechanism comprises a data structure, and wherein periodically receiving the information from the at least one higher-level cache or functional block and storing the information in a tracking mechanism comprises:
   receiving address information from the at least one higher-level cache or functional block for at least one cache block that may be accessed during a future access, the address information comprising at least some of a plurality of address bits of an address for the at least one cache block; and
   using the address information to update the data structure.

8. The method of claim 1, wherein configuring the cache management mechanism comprises:
   configuring the cache management mechanism so that a cache block that is not a cache block that may be accessed during a future access in the cache is not stored in the cache.

9. The method of claim 1, wherein the at least one cache block that may be accessed during a future access in the cache is included in a set of cache blocks typically considered as a group for replacement in accordance with a cache replacement policy, and wherein configuring the cache management mechanism comprises:
   configuring the cache management mechanism so that the at least one cache block is not considered for replacement, but remaining cache blocks in the set of cache blocks are considered for replacement.

10. An apparatus that configures a cache management mechanism, comprising:
    a cache controller in a cache, wherein the cache controller is configured to:
       monitor at least one structure associated with a cache to determine at least one cache block that may be accessed during a future access in the cache, wherein the at least one cache block consists of one or more cache lines within the cache; and
       configure a cache management mechanism based on the determination of the at least one cache block that may be accessed during a future access in the cache, the configuring comprising configuring the cache management mechanism so that a cache block that may be accessed during a future access in the cache is not replaced in the cache.

11. The apparatus of claim 10, wherein, when monitoring the at least one structure associated with the cache, the cache controller is configured to:
    monitor at least one higher-level cache or functional block that comprises information indicating cache blocks that may be accessed during a future access in the cache.

12. The apparatus of claim 11, wherein, when monitoring the at least one higher-level cache, the cache controller is configured to monitor at least one of:
    a record of misses in the at least one higher-level cache; or
    a record of prefetches to be sent from the at least one higher-level cache.

13. The apparatus of claim 11, wherein, when monitoring the at least one functional block, the cache controller is configured to monitor at least one of:
fetch operations in a fetch queue;
loads or stores in a load buffer or a store buffer; or
branch predictions in a branch prediction queue.

14. The apparatus of claim 11, wherein, when monitoring the at least one higher-level cache or functional block, the cache controller is configured to directly acquire the information from the at least one higher-level cache or functional block.

15. The apparatus of claim 11, further comprising:
a tracking mechanism in the cache controller;
wherein the cache controller is configured to:
  periodically receive the information from the at least one higher-level cache or functional block; and
  store the information in a tracking mechanism;
wherein, when monitoring the at least one higher-level cache or functional block, the cache controller is configured to acquire the information indicating cache blocks that may be accessed during a future access in the cache from the tracking mechanism.

16. The apparatus of claim 15, further comprising:
a data structure in the tracking mechanism;
wherein, when periodically receiving the information from the at least one higher-level cache or functional block and storing the information in a tracking mechanism, the cache controller is configured to:
  receive address information from the at least one higher-level cache or functional block for at least one cache block that may be accessed during a future access, the address information comprising at least some of a plurality of address bits of an address for the at least one cache block; and
  use the address information to update the data structure.

17. The apparatus of claim 10, wherein, when configuring the cache management mechanism, the cache controller is configured to:
  configure the cache management mechanism so that a cache block that is not a cache block that may be accessed during a future access in the cache is not stored in the cache.

18. The apparatus of claim 10, wherein the at least one cache block that may be accessed during a future access in the cache is included in a set of cache blocks typically considered as a group for replacement in accordance with a cache replacement policy, and wherein, when configuring the cache management mechanism, the cache controller is configured to:
  configure the cache management mechanism so that the at least one cache block is not considered for replacement, but remaining cache blocks in the set of cache blocks are considered for replacement.

* * * * *